US009671124B2

(12) United States Patent
Sakaguchi et al.

(10) Patent No.: US 9,671,124 B2
(45) Date of Patent: Jun. 6, 2017

(54) MANAGEMENT APPARATUS AND METHOD OF MANAGING AIR-CONDITIONING APPARATUS

(71) Applicants: Hiroaki Sakaguchi, Tokyo (JP); Mitsuru Kitazaki, Tokyo (JP)

(72) Inventors: Hiroaki Sakaguchi, Tokyo (JP); Mitsuru Kitazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 23 days.

(21) Appl. No.: 14/651,814

(22) PCT Filed: Mar. 4, 2013

(86) PCT No.: PCT/JP2013/055841
§ 371 (c)(1),
(2) Date: Jun. 12, 2015

(87) PCT Pub. No.: WO2014/136182
PCT Pub. Date: Sep. 12, 2014

(65) Prior Publication Data
US 2015/0377506 A1 Dec. 31, 2015

(51) Int. Cl.
*G05B 15/00* (2006.01)
*F24F 11/00* (2006.01)
(Continued)

(52) U.S. Cl.
CPC ............ *F24F 11/006* (2013.01); *G05B 15/02* (2013.01); *G06F 3/0617* (2013.01);
(Continued)

(58) Field of Classification Search
CPC .. F24F 11/006; F24F 11/02; F24F 2011/0052; F24F 2011/0061; G05B 15/02;
(Continued)

(56) References Cited

U.S. PATENT DOCUMENTS

2005/0022063 A1* 1/2005 Grebenev ........... G06F 11/0751
714/38.1
2007/0061615 A1* 3/2007 Stalker ............... G06F 11/1441
714/6.2
(Continued)

FOREIGN PATENT DOCUMENTS

JP 2004-005305 A 1/2004
JP 2011-027362 A 2/2011
(Continued)

OTHER PUBLICATIONS

International Search Report of the International Searching Authority mailed May 14, 2013 for the corresponding international application No. PCT/JP2013/055841 (and English translation).
European Extended Search Report of Oct. 4, 2016 in the corresponding EP application No. 13877308.0.
Chinese Office Action of Dec. 22, 2016 in the corresponding CN application No. 201380074177.X (English ranslation attached).

*Primary Examiner* — Kenneth M Lo
*Assistant Examiner* — Yuhui R Pan
(74) *Attorney, Agent, or Firm* — Posz Law Group, PLC

(57) ABSTRACT

A remaining memory capacity of a memory is acquired in a predetermined cycle, and remaining memory capacity MR is stored in a remaining capacity database in association with an acquisition date. After that, it is determined whether or not a memory leak is present based on the remaining memory capacity and the acquisition date stored in the remaining capacity database. When it is determined that the memory leak possibly occurs, a usage limit period being a length of time to a point when a forced restart according to a usage limit threshold is performed is computed based on the remaining memory capacity and a memory decreasing rate. A restart schedule (and an all-stop period) is set within the usage limit period. On a date of the restart schedule, a management apparatus for managing an air-conditioning apparatus is restarted.

14 Claims, 3 Drawing Sheets

(51) Int. Cl.
  *G06F 11/00*  (2006.01)
  *G05B 15/02*  (2006.01)
  *G06F 3/06*   (2006.01)
  *G06F 17/30*  (2006.01)

(52) U.S. Cl.
  CPC .......... *G06F 3/0653* (2013.01); *G06F 3/0673* (2013.01); *G06F 11/00* (2013.01); *G06F 17/30339* (2013.01); *G06F 17/30477* (2013.01); *F24F 2011/0052* (2013.01); *F24F 2011/0061* (2013.01)

(58) Field of Classification Search
  CPC ............... G06F 11/00; G06F 17/30339; G06F 17/30477; G06F 3/0617; G06F 3/0653; G06F 3/0673
  USPC ......................................................... 700/276
  See application file for complete search history.

(56) References Cited

U.S. PATENT DOCUMENTS

2008/0301504 A1* 12/2008 Chen ..................... G06F 11/008
　　　　　　　　　　　　　　　　　　　　　714/42
2012/0067560 A1*  3/2012 Bergman ............... F24F 11/006
　　　　　　　　　　　　　　　　　　　　　165/238

FOREIGN PATENT DOCUMENTS

JP　　　2011-153743 A　　8/2011
JP　　　2011-186739 A　　9/2011

* cited by examiner

MANAGEMENT APPARATUS AND METHOD OF MANAGING AIR-CONDITIONING APPARATUS

CROSS REFERENCE TO RELATED APPLICATION

This application is a U.S. national stage application of International Application No. PCT/JP2013/055841 filed on Mar. 4, 2013, the disclosure of which is incorporated herein by reference.

TECHNICAL FIELD

The present invention relates to a management apparatus and method of managing an operation of an air-conditioning apparatus including an indoor unit and an outdoor unit.

BACKGROUND ART

A memory leak may occur due to a failure of software or other causes. When such a memory leak is caused by a failure of management software in a management apparatus for managing an air-conditioning apparatus and a memory capacity thereof is reducing, the management apparatus may be restarted in some cases for recovery, before a remaining memory capacity becomes empty. Various methods have been proposed that prevent the memory leak in an apparatus that controls continuously-operating equipment (for example, see Patent Literatures 1 and 2).

Patent Literature 1 discloses periodically storing, as time series data, a memory usage, a CPU load, and a timestamp of memory usage acquisition, predicting an arrival time when a memory reaches a usage limit based on the time series data of the memory usage, obtaining a time slot in which the CPU load is reduced immediately before the arrival time based on the time series data of the CPU load, and performing recovery processing in the time slot. Patent Literature 2 discloses a process management program configured to stop a predetermined process so as not to interrupt an operation of an application program when a memory usage of a process being executed reaches a specified value.

CITATION LIST

Patent Literature

Patent Literature 1: Japanese Unexamined Patent Application Publication No. 2004-5305
Patent Literature 2: Japanese Unexamined Patent Application Publication No. 2011-186739

SUMMARY OF INVENTION

Technical Problem

In the case of the above methods in Patent Literatures 1 and 2, the restart or the like is performed when the remaining memory capacity is reduced regardless of a state of the equipment as a control object. Therefore, control and monitoring of the entire air-conditioning apparatus are stopped from the restart of the management apparatus until completion of the restart. Thus, a failure may occur in controlling the operation of the air-conditioning apparatus to cause disadvantages for users.

The present invention has been made in order to overcome the above problems, and an object thereof is to provide a management apparatus for managing an air-conditioning apparatus capable of minimizing an influence on operation control of an apparatus by a recovery work from a memory leak.

Solution to Problem

A management apparatus for managing an air-conditioning apparatus of the present invention is a management apparatus for managing an air-conditioning apparatus, the management apparatus including a memory to store data, and managing an operation of an air-conditioning apparatus including at least one indoor unit and an outdoor unit, the management apparatus comprising: remaining memory capacity acquisition means to acquire a remaining memory capacity of the memory; memory leak determination means to determine whether or not a memory leak is present in the memory based on the remaining memory capacity acquired by the remaining memory capacity acquisition means; usage limit estimation means to estimate, when the memory leak determination means determines that the memory leak is present, a usage limit period being a length of time to a point when the memory reaches a preset usage limit threshold; a schedule table storing an operation schedule of the air-conditioning apparatus and the management apparatus; schedule management means to search the schedule table for an all-stop period in which operations of all of the at least one indoor unit are stopped within the usage limit period estimated by the usage limit estimation means, and set a restart schedule for restarting the management apparatus in the schedule table in accordance with the all-stop period searched out; and equipment control means to restart the management apparatus according to the restart schedule set in the schedule table by the schedule management means.

Advantageous Effects of Invention

In accordance with the management apparatus of the present invention, when the remaining memory capacity is reduced by the memory leak, the management apparatus for managing an air-conditioning apparatus is restarted during the all-stop period before reaching the usage limit period. Accordingly, a recovery work from the memory leak can be completed within a period in which a load of monitoring or controlling the air-conditioning apparatus is small, and disadvantages on operation control of the air-conditioning apparatus caused in responding to the memory leak can be thereby minimized.

DESCRIPTION OF EMBODIMENTS

Figure 1:
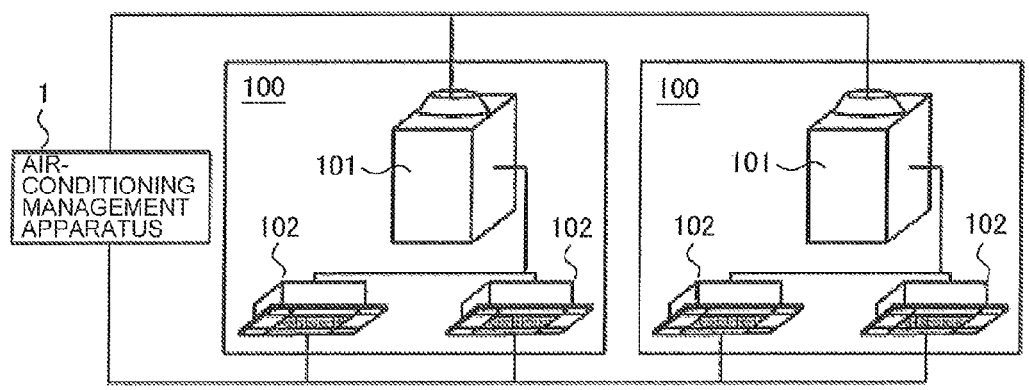
FIG. 1 is a system configuration diagram illustrating a preferred embodiment of a management apparatus for managing an air-conditioning apparatus of the present invention.

An embodiment of a management apparatus for managing an air-conditioning apparatus of the present invention will be described hereinafter with reference to the drawings. FIG. 1 is a system configuration diagram illustrating a preferred embodiment of a management apparatus for managing an air-conditioning apparatus of the present invention. A management apparatus 1 for managing an air-conditioning apparatus will be described with reference to FIG. 1. The management apparatus 1 for managing an air-conditioning apparatus is connected to a plurality of air-conditioning apparatuses 100 so as to enable data transmission, and performs centralized management of operations of the respective air-conditioning apparatuses 100. Each of the air-conditioning apparatuses 100 includes an outdoor unit 101, and one or a plurality of indoor units 102 connected to the outdoor unit 101 via a refrigerant pipe. The management apparatus 1 can control each of the outdoor unit 101 and the indoor units 102 in each of the air-conditioning apparatuses 100 via a transmission line. Although a case in which the management apparatus 1 for managing an air-conditioning apparatus manages two air-conditioning apparatuses 100 is illustrated in FIG. 1, the management apparatus 1 for managing an air-conditioning apparatus may be connected to one air-conditioning apparatus 100, or may also manage plural, i.e., three or more air-conditioning apparatuses 100. Also, the air-conditioning apparatus 100 may include the plurality of indoor units 102 as shown in FIG. 1, or may include one indoor unit 102.

The aforementioned management apparatus 1 for managing an air-conditioning apparatus is constituted of a microcomputer such as a DSP. The management apparatus 1 for managing an air-conditioning apparatus includes a central processing unit (CPU) that executes a program, and a memory (RAM) that stores various data and forms a temporary working memory area when the program is executed. The management apparatus 1 for managing an air-conditioning apparatus also includes input means, such as a touch panel, and an external input terminal that perform input of an operation instruction and schedule management from a user. The management apparatus 1 for managing an air-conditioning apparatus controls the operation of the air-conditioning apparatus 100 based on the input from a user and detection signals from various sensors.

When a predetermined program is executed in the management apparatus 1 for managing an air-conditioning apparatus, the program dynamically secures a memory area as a temporary working area or a data storage area. The program releases the memory area when it is no longer required to secure the memory area. However, if the memory area dynamically secured by the program is not released, a phenomenon called a memory leak is present in which memory resources of a system continue to be occupied. In a case in which a new program is executed in a state in which the memory leak is present, no memory area can be allocated for executing the program, resulting in a malfunction of the program. Particularly, in a case in which the memory leak is present in a program that continuously works for a long time as in the management apparatus 1 for managing an air-conditioning apparatus, the memory resources are successively consumed, resulting in a drop in performance of the management apparatus 1 for managing an air-conditioning apparatus.

Thus, the management apparatus 1 for managing an air-conditioning apparatus has a function to perform a forced restart in order to prevent a decrease in the performance or falling into an uncontrollable state due to the memory leak, and a function to perform an automatic restart before the above forced restart is performed by detecting the occurrence of the memory leak. To be more specific, the management apparatus 1 for managing an air-conditioning apparatus has a function to perform the forced restart when a memory M exceeds a usage limit threshold (for example, a memory usage rate of 90%), and a function to perform the automatic restart during a period in which an influence on the operation of the air-conditioning apparatus 100 can be minimized when it is determined that the memory leak is present.

Figure 2:
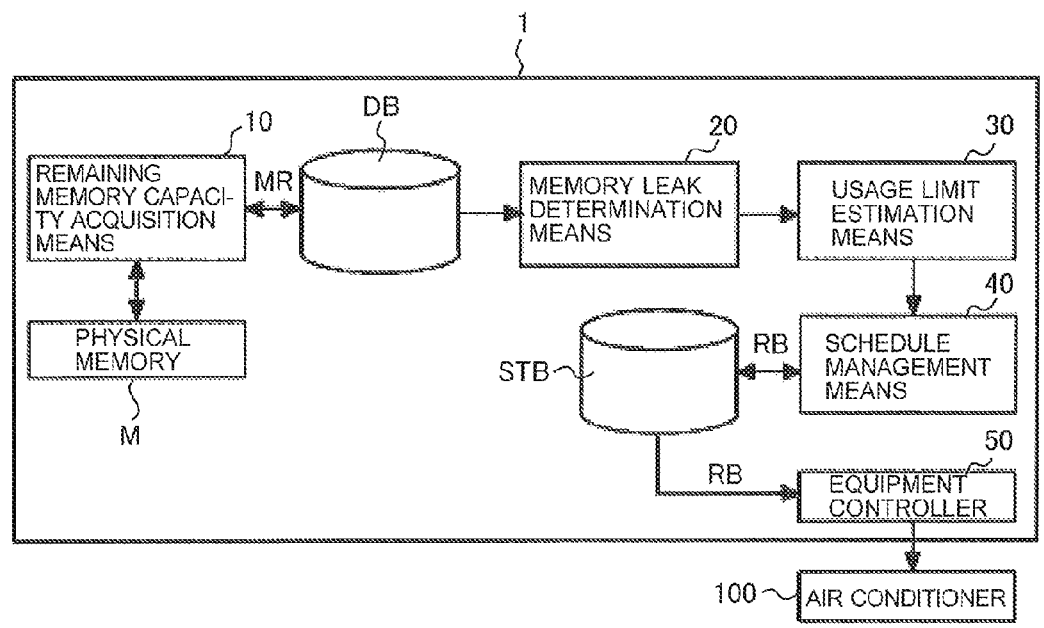
FIG. 2 is a block diagram illustrating one example of the management apparatus for managing an air-conditioning apparatus in FIG. 1.

FIG. 2 is a functional block diagram illustrating one example of the management apparatus 1 for managing an air-conditioning apparatus in FIG. 1. The management apparatus 1 for managing an air-conditioning apparatus in FIG. 2 includes remaining memory capacity acquisition means 10, memory leak determination means 20, usage limit estimation means 30, schedule management means 40, and equipment control means 50. The remaining memory capacity acquisition means 10 acquires a remaining memory capacity MR from the memory M in each predetermined cycle. The remaining memory capacity acquisition means 10 also has a function to store a date on which the remaining memory capacity MR is acquired, and the remaining memory capacity MR in association with each other in a remaining capacity database DB.

The memory leak determination means 20 determines whether or not the memory leak is present in the memory M based on the remaining memory capacity MR and the acquisition date stored in the remaining capacity database DB by the remaining memory capacity acquisition means 10. To be more specific, the memory leak determination means 20 determines that the memory leak is present, for example, when an amount of decrease of the remaining memory capacity MR exceeds a predetermined value, and a period in which the remaining memory capacity MR continues to decrease exceeds a predetermined period. Note that a method for determining the memory leak is not limited to the above method, and a known technique may be employed, for example, in which a remaining memory capacity decreasing rate per unit time of the memory M is computed from the remaining memory capacity MR decreasing in an interval between the acquisition cycles, and it is determined that the memory leak is present when the remaining memory capacity decreasing rate (or a moving average of a plurality of remaining memory capacity decreasing rates) is equal to or more than a preset threshold.

When the memory leak determination means 20 determines that the memory leak is present in the memory M, the usage limit estimation means 30 estimates a usage limit period LP until the memory M reaches the usage limit threshold. The usage limit estimation means 30 computes the remaining memory capacity decreasing rate per unit time by using the remaining memory capacity MR acquired in the predetermined cycle and the acquisition date thereof in the remaining memory capacity acquisition means 10, and, when the remaining memory capacity MR is assumed to decrease at the remaining memory capacity decreasing rate, estimates a period being a length of time to a point when the memory M reaches the usage limit threshold by an approximation straight line as the usage limit period LP.

The schedule management means 40 manages an operation schedule of the air-conditioning apparatus 100 and the management apparatus 1 for managing an air-conditioning apparatus. A schedule table STB stores a date on which the operation schedule is registered, a control object, an operation content, a date on which control is performed, or the like. The schedule management means 40 has a function to register or delete the schedule in or from the schedule table STB according to the input from a user or the like.

Particularly, the schedule management means 40 has a function to search, when it is determined that the memory leak is present, the operation schedule set in the schedule table STB, for an all-stop period SD in which the operation of the air-conditioning apparatus 100 is all stopped within the usage limit period LP estimated by the usage limit estimation means 30, and set a restart schedule RB for restarting the management apparatus 1 for managing an air-conditioning apparatus in the schedule table STB in accordance with the all-stop period SD that is searched out. Note that the all-stop period means a period in which operations of all the indoor units 102 under the management of the management apparatus 1 for managing an air-conditioning apparatus are stopped. The all-stop period may also mean a period in which operations of both the indoor units 102 and the outdoor unit 101 are all stopped.

Here, in a case in which the all-stop period SD is already set within the usage limit period LP in the schedule table STB, the schedule management means 40 registers the restart schedule RB in the schedule table STB in accordance with the all-stop period SD. When a schedule of the all-stop period SD is changed after setting the restart schedule RB, the schedule management means 40 changes the restart schedule RB in accordance with the change in the all-stop period SD. Accordingly, it is possible to reliably perform the restart during the all-stop period SD.

On the other hand, in a case in which the all-stop period SD is not set in the schedule table STB, the schedule management means 40 newly sets the all-stop period SD within the usage limit period LP in the schedule table STB. Note that a method for newly setting the all-stop period SD is not limited to the above method, and various methods can be used. For example, setting conditions for setting the all-stop period SD, such as a day of a week and a time slot in which a load on the air-conditioning apparatus 100 or the management apparatus 1 is small, are previously stored in the schedule management means 40, and the schedule management means 40 may set the all-stop period SD on a date which satisfies the stored setting conditions within the usage limit period LP. Alternatively, the schedule management means 40 may automatically learn an operation pattern from operation schedule information set in the schedule table STB, and set a period in which a load on the air-conditioning apparatus 100 or the management apparatus 1 is small out of the operation pattern as the all-stop period SD.

Alternatively, the schedule management means 40 may set the restart schedule RB by assuming that the all-stop period SD is started when it is detected that all the indoor units 102 under the management (or the entire air-conditioning apparatus 100) are stopped, without setting a particular date as the restart schedule RB. In other words, the schedule management means 40 may set and execute the restart schedule RB by detecting that substantially the same state as that in which the schedule of the all-stop period SD is executed is obtained within the usage limit period LP.

The equipment control means 50 has a function to control the operation of the air-conditioning apparatus 100, and also control an operation of the management apparatus 1 for managing an air-conditioning apparatus. Particularly, the equipment control means 50 restarts the management apparatus 1 for managing an air-conditioning apparatus based on the restart schedule RB set in the schedule table STB. Since the restart schedule RB is set in accordance with the all-stop period SD as described above, the equipment control means 50 restarts the management apparatus 1 for managing an air-conditioning apparatus during the all-stop period SD of the air-conditioning apparatus 100. Note that the equipment control means 50 has a function to forcibly restart the management apparatus 1 for managing an air-conditioning apparatus when the memory M exceeds the usage limit threshold as described above. Since the equipment control means 50 cannot execute the program stored in the management apparatus 1 for managing an air-conditioning apparatus while the management apparatus 1 is being restarted, an operation of monitoring the air-conditioning apparatus 100 is restricted.

As described above, the management apparatus 1 for managing an air-conditioning apparatus is restarted during the all-stop period SD of the air-conditioning apparatus 100 before the forced restart according to the usage limit threshold is performed. Accordingly, it is possible to surely prevent the management apparatus 1 for managing an air-conditioning apparatus from being restarted during a period in which the air-conditioning apparatus 100 needs to be controlled or monitored.

Figure 3:
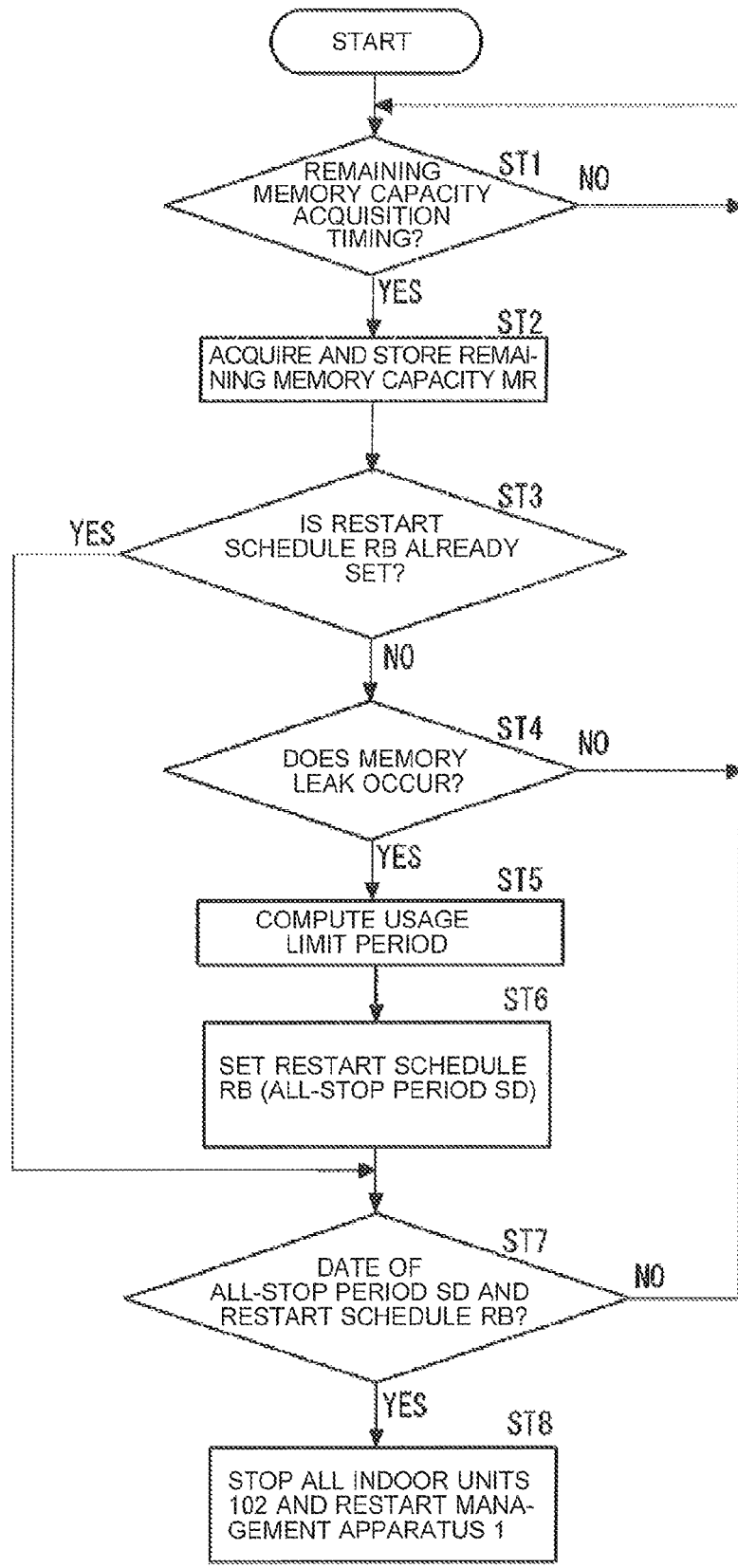
FIG. 3 is a flowchart illustrating an operation example of the management apparatus for managing an air-conditioning apparatus in FIG. 2.
Figure 4:
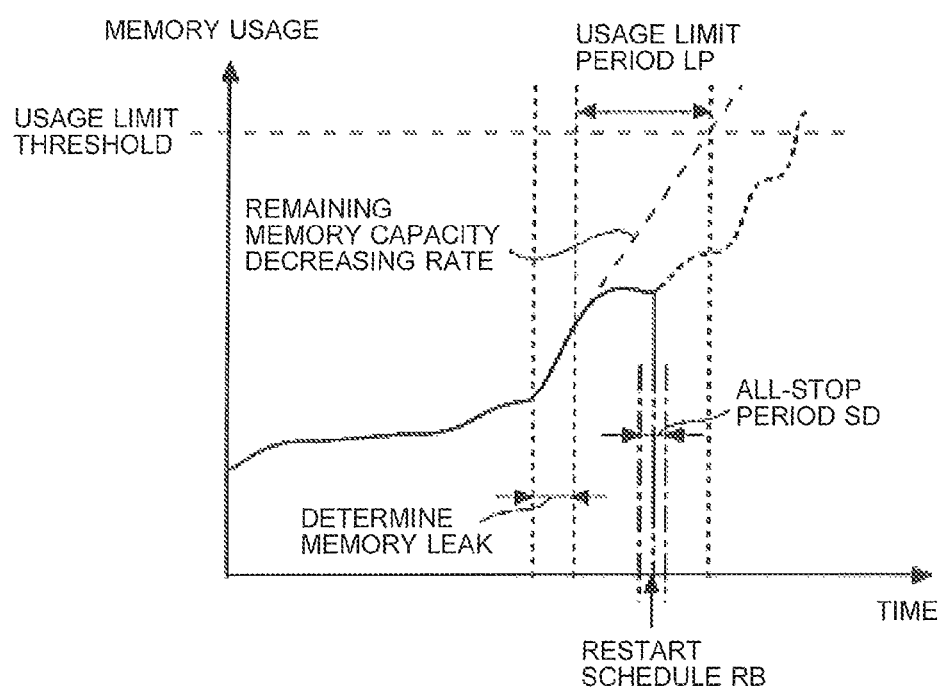
FIG. 4 is a graph illustrating one example of a transition of a memory usage with passage of time in a memory of the management apparatus in FIG. 2.

FIG. 3 is a flowchart illustrating an operation example of the management apparatus 1 for managing an air-conditioning apparatus, and FIG. 4 is a graph illustrating one example of a transition of a memory usage with passage of time in the memory M of the management apparatus in FIG. 2. The operation example of the management apparatus 1 for managing an air-conditioning apparatus will be described with reference to FIGS. 1 to 4. First, the remaining memory capacity acquisition means 10 acquires the remaining memory capacity MR at an acquisition timing of the predetermined cycle (step ST1). The remaining memory capacity acquisition means 10 stores the remaining memory capacity MR in the remaining capacity database DB in association with the acquisition date (step ST2). After that, the schedule management means 40 determines whether or not the restart schedule RB is already set in the schedule table STB (step ST3).

In a case in which the restart schedule RB is set in the schedule table STB, the restart schedule RB is not newly set, and the remaining memory capacity MR continues to be acquired until a date of the already-set restart schedule RB (steps ST1 to ST7). On the other hand, in a case in which the restart schedule RB is not set, the memory leak determination means 20 determines whether or not the memory leak is present (step ST4).

When it is determined that the memory leak possibly occurs, the usage limit estimation means 30 computes the usage limit period LP until the forced restart according to the usage limit threshold is performed based on the remaining memory capacity MR and the memory decreasing rate (step ST5). After that, the schedule management means 40 sets the restart schedule RB (and the all-stop period SD) within the usage limit period LP (step ST6). Moreover, the operation of the air-conditioning apparatus 100 is continued until the date of the restart schedule RB (steps ST1 to ST7). On the date of the restart schedule RB, the management apparatus 1 is restarted by the equipment control means 50 (step ST8).

As described above, since the management apparatus 1 is restarted during the usage limit period LP before the forced restart according to the usage limit threshold is performed, and during the all-stop period SD of the air-conditioning apparatus 100, it is possible to prevent occurrence of an unfavorable situation for a user, such as a sudden stop of the operation of the air-conditioning apparatus 100, or such that the air-conditioning apparatus 100 cannot be operated, due to the restart of the management apparatus 1 for managing an air-conditioning apparatus. Also, since the restart schedule RB is automatically set, it is possible to restart and restore the management apparatus 1 for managing an air-conditioning apparatus without making a user aware of the stop of the air-conditioning apparatus 100.

Furthermore, when the all-stop period SD does not exist within the usage limit period LP, the schedule management means 40 sets the all-stop period SD within the usage limit period LP. It is thus possible to avoid a situation in which the forced restart is performed while a process that applies a large load to the management apparatus 1 for managing an air-conditioning apparatus, such as demand control, is being performed. Alternatively, when the schedule management means 40 sets the restart schedule RB by assuming that the period in which all the indoor units 102 are stopped is the all-stop period SD based on the operation schedule in the schedule table STB, the restart can be performed in a state in which a management load on the management apparatus 1 for managing an air-conditioning apparatus is smallest, and the operation of the air-conditioning apparatus 100 can be smoothly controlled.

The embodiment of the present invention is not limited to the above embodiment. For example, when the schedule management means 40 sets the restart schedule RB, the restart schedule RB may be set before a schedule of performing an operation in which monitoring or control is required at all times, such as the demand control. Accordingly, it is possible to prevent the forced restart of the management apparatus 1 for managing an air-conditioning apparatus according to the usage limit threshold while an operation in which the air-conditioning apparatus 100 needs to be controlled and monitored is being performed.

REFERENCE SIGNS LIST

1 Management apparatus for an air-conditioning apparatus, 10 Remaining memory capacity acquisition means, 20 Memory leak determination means, 30 Usage limit estimation means, 40 Schedule management means, 50 Equipment control means, 100 Air conditioner, 101 Outdoor unit, 102 Indoor unit, DB Remaining capacity database, LP Usage limit period, M Memory, MR Remaining memory capacity, SD All-stop period, STB Schedule table, RB Restart schedule

The invention claimed is:

1. A management apparatus for managing an air-conditioning apparatus, the management apparatus including a memory to store data, and managing an operation of an air-conditioning apparatus including a plurality of indoor units and an outdoor unit, the management apparatus comprising:
   a remaining memory capacity acquisition unit to acquire a remaining memory capacity of the memory;
   a memory leak determination unit to determine whether or not a memory leak is present in the memory based on the remaining memory capacity acquired by the remaining memory capacity acquisition unit;
   a usage limit estimation unit to estimate, when the memory leak determination unit determines that the memory leak is present, a usage limit period being a length of time to a point when the memory reaches a preset usage limit threshold;
   a schedule table storing an operation schedule of the air-conditioning apparatus and the management apparatus, wherein the operation schedule for one of the plurality of indoor units, in the operation schedule stored in the schedule table, has an operation period which is independent of an other of the plurality of indoor units;
   a schedule management unit to search the schedule table for an all-stop period in which operations of all of the plurality of Indoor units are stopped within the usage limit period estimated by the usage limit estimation unit, and set a restart schedule for restarting the management apparatus in the schedule table in accordance with the all-stop period searched out; and
   an equipment control unit to restart the management apparatus according to the restart schedule set in the schedule table by the schedule management unit.

2. The management apparatus for managing an air-conditioning apparatus of claim 1, wherein the memory leak determination unit determines that the memory leak is present when a period in which the remaining memory capacity continues to decrease exceeds a predetermined period.

3. The management apparatus for managing an air-conditioning apparatus of claim 1, wherein the usage limit estimation unit estimates the usage limit period being a length of time to a point when the memory reaches the usage limit threshold, based on a decreasing rate of the remaining memory capacity per unit time.

4. The management apparatus for managing an air-conditioning apparatus of claim 1, wherein the equipment control unit restricts an operation of monitoring the air-conditioning apparatus while the management apparatus is being restarted.

5. The management apparatus for managing an air-conditioning apparatus of claim 1, wherein the schedule management unit changes the restart schedule in accordance with a change in the all-stop period when a schedule of the all-stop period is changed after setting the restart schedule.

6. The management apparatus for managing an air-conditioning apparatus of claim 1, wherein the schedule management unit has a function to newly set the all-stop period within the usage limit period when the all-stop period cannot be searched within the usage limit period.

7. The management apparatus for managing an air-conditioning apparatus of claim 1, wherein the schedule management unit sets the restart schedule by assuming that the all-stop period is started when it is detected that all of the plurality of indoor units are stopped in a case in which the all-stop period cannot be searched within the usage limit period.

8. The management apparatus for managing an air-conditioning apparatus of claim 1, wherein
   the all-stop period which is searched for by the schedule management unit means a period in which operations of all of the plurality of indoor units under management of the management apparatus are stopped, and operation of the outdoor unit under management of the management apparatus may continue during the all-stop period.

9. The management apparatus for managing an air-conditioning apparatus of claim 1, wherein
   the all-stop period which is searched for by the schedule management unit means a period in which operations of the outdoor unit and all of the plurality of indoor units and under management of the management apparatus are stopped.

10. The management apparatus for managing an air-conditioning apparatus of claim 1, wherein
   the management apparatus further manages an operation of a plurality of air-conditioning apparatuses each including at least one indoor unit, the plurality of air-conditioning apparatus including the air-conditioning apparatus that includes the plurality of indoor units, the schedule table further stores an operation schedule of the plurality of air-conditioning apparatuses, the all-stop period which is searched for means a period in which, for all of the plurality of air-conditioning apparatuses, operations of all of the plurality of indoor units for the plurality of air-conditioning apparatuses under management of the management apparatus are stopped.

11. A method of managing an air-conditioning apparatus, the air-conditioning apparatus including a memory to store data, and managing an operation of an air-conditioning apparatus including a plurality of indoor units and an outdoor unit, the method comprising:

acquiring a remaining memory capacity of the memory;

determining whether or not a memory leak is present in the memory based on the acquired remaining memory capacity;

estimating a usage limit period being a length of time to a point when the memory reaches a preset usage limit threshold, when the step of determining determines that the memory leak is present;

searching a schedule table that stores an operation schedule of the air-conditioning apparatus and the management apparatus for an ail-stop period in which operations of all of the plurality of indoor units are stopped within the estimated usage limit period, and setting a restart schedule for restarting the management apparatus in the schedule table in accordance with the all-stop period searched out, wherein the stored in the schedule table, has an operation period which is independent of an other of the plurality of indoor units; and restarting the management apparatus according to the set restart.

12. The method of managing an air-conditioning apparatus according to claim 11, wherein the all-stop period which is searched for means a period in which operations of all of the plurality of indoor units under management of the management apparatus are stopped, and operation of the outdoor unit under management of the management apparatus may continue during the all-stop period.

13. The method of managing an air-conditioning apparatus according to claim 11, wherein the all-stop period which is searched for means a period in which operations of the outdoor unit and all of the plurality of indoor units and under management of the management apparatus are stopped.

14. The method of managing an air-conditioning apparatus according to claim 11, wherein the management apparatus further manages an operation of a plurality of air-conditioning apparatuses each including at least one indoor unit, the plurality of air-conditioning apparatus including the air-conditioning apparatus that includes the plurality of indoor units, the schedule table further stores an operation schedule of the plurality of air-conditioning apparatuses, the all-stop period which is searched for means a period in which, for all of the plurality of air-conditioning apparatuses, operations of all of the plurality of indoor units for the plurality of air-conditioning apparatuses under management of the management apparatus are stopped.

* * * * *